United States Patent [19]
Sarbach

[11] Patent Number: 5,983,146
[45] Date of Patent: Nov. 9, 1999

[54] ELECTRONIC CONTROL SYSTEM FOR A HEATING, VENTILATING AND/OR AIR CONDITIONING INSTALLATION FOR A MOTOR VEHICLE

[75] Inventor: Jean-Charles Sarbach, Gallardon, France

[73] Assignee: Valeo Climatisation, La Verriere, France

[21] Appl. No.: 08/771,945

[22] Filed: Dec. 23, 1996

[30] Foreign Application Priority Data

Dec. 27, 1995 [FR] France .................................. 95.15570

[51] Int. Cl.$^6$ .............................. G06F 15/20; B60H 3/00
[52] U.S. Cl. ................................ 701/36; 237/28; 237/46; 236/91 D
[58] Field of Search .......................... 701/36; 236/91 R, 236/91 D; 237/28, 46; 91/1 B

[56] References Cited

U.S. PATENT DOCUMENTS

| | | | |
|---|---|---|---|
| 4,486,837 | 12/1984 | Kojima et al. | 701/36 |
| 5,317,403 | 5/1994 | Keenan | 348/731 |
| 5,615,380 | 3/1997 | Hyatt | 345/520 |

FOREIGN PATENT DOCUMENTS

| | | |
|---|---|---|
| 158607 | 10/1985 | European Pat. Off. . |
| 575956 | 12/1993 | European Pat. Off. . |
| 27 50 408 | 5/1979 | Germany . |

*Primary Examiner*—William A. Cuchlinski, Jr.
*Assistant Examiner*—Yonel Beaulieu
*Attorney, Agent, or Firm*—Morgan & Finnegan, LLP

[57] ABSTRACT

The control system includes: a memory for memorizing a table of correspondence between inputs which comprise, on the one hand, sets of parameters and, on the other hand, operational adjustments of the working parts of the installation; an installation interface for instigating such adjustments; and a data unit having touch pads or other manual setting elements operated by the user so as to define a set of desired (or running) parameters. The data unit also has manual programming elements, and the memory includes individual zones for storing a set of parameters, each of these zones being associated with one of the manual programming elements, so that actuation of one of the latter stores the set of running parameters in the associated programming zone as a set of programmed parameters. The control system also includes selection means for designating a set of programmed parameters in accordance with a predefined criterion, in such a way that the installation interface can then instigate the corresponding adjustments.

29 Claims, 2 Drawing Sheets

ELECTRONIC CONTROL SYSTEM FOR A HEATING, VENTILATING AND/OR AIR CONDITIONING INSTALLATION FOR A MOTOR VEHICLE

FIELD OF THE INVENTION

This invention relates to controlled systems or apparatus for the electronic control of installations for heating, ventilating and/or air conditioning a motor vehicle. More particularly, it relates to an electronic control system or apparatus comprising a control device which includes: a memory for a table of correspondence between, on the one hand, inputs which comprise sets of parameters and, on the other hand, sets of adjustments of working parts of the installation; an installation interface for carrying out such adjustments; and a data unit on which a user can enter the required values, or settings, for a set of what will be called running parameters, i.e. values of parameters which can be changed at will, as distinct from pre-set values treated as fixed values in the operation of the system.

BACKGROUND OF THE INVENTION

Entry of the running parameters is made on a data unit mounted in a selected position in the vehicle, as for example on the fascia panel. This data unit generally includes a plurality of manual setting elements which produce one or more parameters defining atmospheric conditions in the cabin of the vehicle.

In some cases, there are manual setting elements automatically instigate the setting up of a preferential pattern of adjustments of the installation which is pre-programmed by the manufacturer of the apparatus. In that type of installation, the user is then unable to achieve his own adjustment programmes, which means that he is obliged to define a set of parameters every time he finds himself in a particular given situation. This operation is tedious, and can be dangerous for the passengers while the driver is performing it.

DISCUSSION OF THE INVENTION

One object of the invention is therefore to provide a control means, in particular for a heating, ventilating and/or air conditioning installation, which does not have the drawbacks of the apparatus of the prior art.

To this end, the invention proposes a control system with a control device, of the kind described more particularly above under the heading "Field of the Invention", and in which, firstly, the data unit is provided with manual programming elements, and secondly, the memory comprises a variety of zones, which are adapted individually to store a set of parameters in accordance with a predetermined format, each of these zones being associated with a predetermined said manual programming element in such a way that actuation of one of the manual programming elements stores the set of running parameters as a "set of programmed parameters" in the programs associated with that manual programming element. The apparatus further includes selection means which enable a set of programmed parameters to be designated in accordance with a pre-defined criterion, in such a way that the installation interface instigates the adjustments which correspond to the set of programmed parameters.

In this way an electronic control device is achieved which enables a plurality of programs for adjustments defined by the user to be memorised, with a view to their eventual use by selection of one of the manual programming elements, such as touch pads or the like.

According to another feature of the invention, the selection means are arranged so as to authorise the memorising of the set of running parameters in accordance with the pre-determined criterion, as a set of programmed parameters in the programming zone which is associated with the manual programming element used.

According to a further feature of the invention, the pre-defined criterion applies to the length of time for which a manual programming element is actuated. This time is preferably measured by a timing means which is part of the selection means, the latter being arranged so as to select, as a function of the pre-defined criterion, a mode of operation of the manual programming means from a first mode, in which an actuated manual programming element stores a set of running parameters as a set of programmed parameters in the programming zone associated with the manual programming element that has been operated, and a second mode in which a manual programming element designates a programmed set of parameters.

According to yet another feature of the invention, the selection means include means for performing a comparison between the time of actuation of a manual programming element on the one hand, and a selected threshold value of time on the other hand, the positive or negative difference between that actuating time and the said threshold value then serving as the pre-determined criterion.

Preferably, where the threshold value is exceeded by the time of actuation of the manual programming element, the selection means are arranged to cause the latter to operate in the first mode, while if the manual programming element is operated for a time shorter than the threshold value, the selection means are arranged to cause the manual programming element which is actuated to operate in the second mode.

According to a further feature of the invention, the memory includes a zone (referred to as a running adjustment zone), which is adapted to memorise systematically, in a set of running parameters, the state of the parameter or parameters which have just been defined by the data unit. Thus, once the user has finished defining a set of parameters, this set is stored so that it can if desired be used again later.

Preferably, in the case where the installation operates on adjustments corresponding to a set of programmed parameters, the installation interface is adapted to re-establish the adjustments corresponding to the set of running adjustments memorised in the running adjustment zone of the memory, when the data unit is activated. In that case, when the system is in a programmed operating mode, and it is desired to re-establish the adjustments which were current initially, it is sufficient simply to actuate any one of the manual setting elements of the data unit.

Further features and advantages of the invention will appear on the reading of the following detailed description of some preferred embodiments of the invention, given by way of non-limiting example only and with reference to the accompanying drawings.

DESCRIPTION OF PREFERRED EMBODIMENTS OF THE INVENTION

Figure 1:
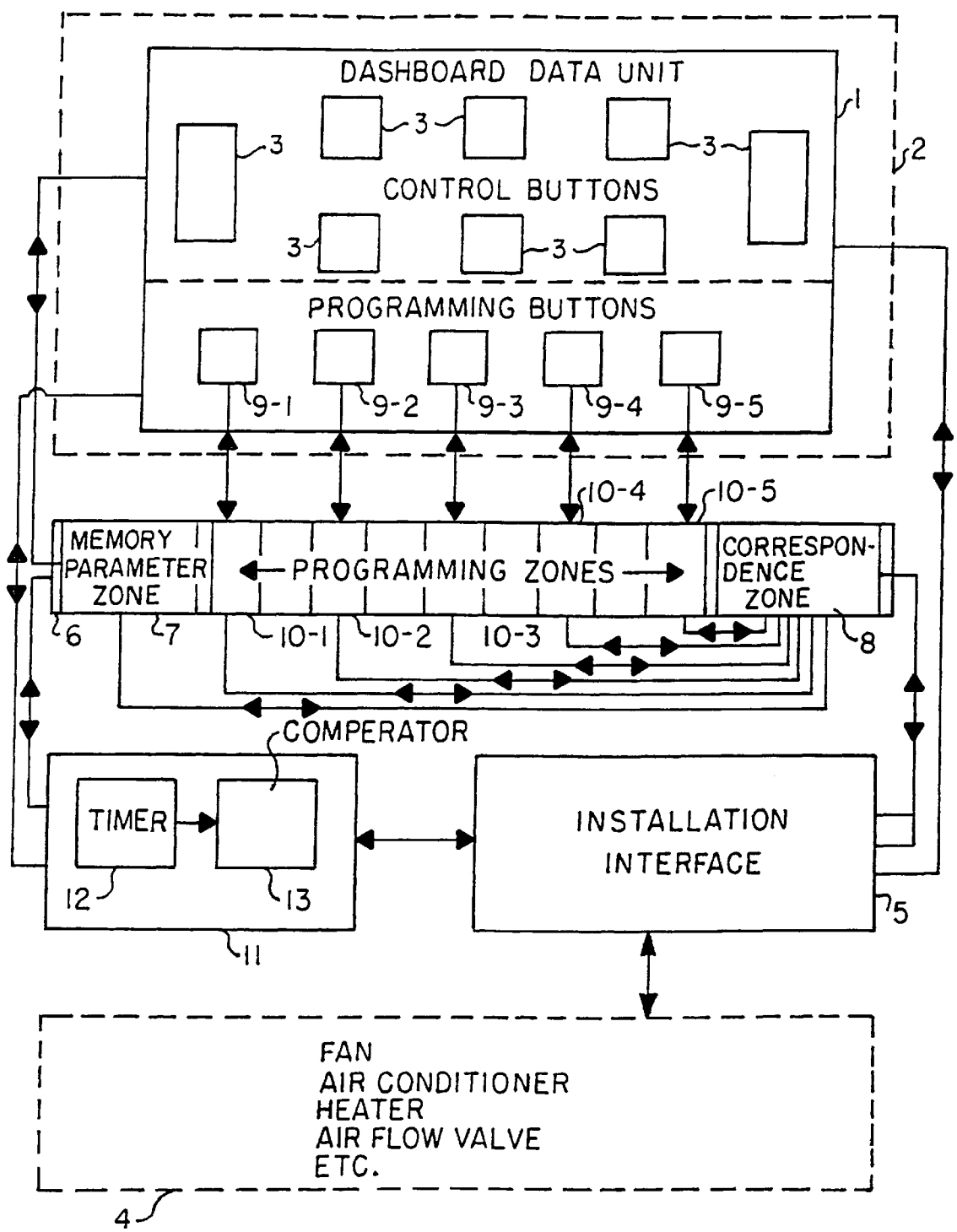
FIG. 1 is a diagram illustrating a control system according to the invention for a heating, ventilating, and/or air conditioning installation.

An installation for heating, ventilating and/or air conditioning, for example for the cabin of a motor vehicle, comprises in particular, a data unit 1, which is generally housed in a casing 2, and which comprises a number of manual setting elements 3, which may be of the push button or rotary type, or in the form of cursors or touch pads. The purpose of these setting elements is to enable the user to define required atmospheric and thermal conditions for all or part of the vehicle cabin. These atmospheric conditions are to be understood to be, in particular, the air flow rate and the pattern of distribution of air treated by the installation, implemented, in particular, by working parts of the installation diagrammatically indicated in FIG. 1 at 4.

The casing 2 of the data unit is for example mounted in the fascia panel between the driver and the front passenger, who will be referred to simply as the users in the rest of this description. The data unit 1 may be without a casing; in that case, the touch pads are incorporated in the fascia panel, which then has an appropriate number of apertures for this purpose.

The manual setting elements 3 are connected to an interface 5 connected to the working parts 4, through a memory 6 which is divided into independent storage zones, among which is zone 7, which is called a running adjustment zone, and which systematically memorises, in a set of parameters called "a set of running parameters", the state of the atmospheric conditions which are defined by means of the data unit 1, and a zone 8, called a correspondence zone. The zone 8 contains a correspondence table which establishes a pre-determined correspondence between, on the one hand, inputs comprising a set of parameters (and sensor output signals, which may be the values of running adjustments), and, on the other hand, adjustments of working parts 4 of the installation. In other words, the memory zone 8 contains the function of transfer of the adjustment; it may be envisaged that several independent transfer functions may co-exist.

First, when the user defines by one or more parameters using the manual setting element 3 of the data unit 1, these parameters are memorised in the form of a set of running parameters in a given format. This set is then applied to the correspondence table in the correspondence zone 8, which, in response, supplies to the installation interface 5 information signals which enable the latter to establish the adjustments for the working parts 4, corresponding to the running parameters defined by the user.

In the case of a heating and ventilation installation, the working parts 4 consist, in particular, of a variable flow blower for producing the airstream, a heating radiator for heating the air delivered from the blower, and a plurality of distribution valves for distributing the air in an air distribution unit and for distributing it to the various air vents fitted in the cabin of the vehicle. It will of course be understood that the invention is just as well applicable to air conditioning apparatus.

In order to enable the user to memorise certain sets of parameters which he needs, and which are not part of any pre-programmed sets which are accessible with some of the manual setting elements, the data unit 1 includes a plurality of manual programming elements 9-$i$ (where, in this example i=1 to 5), which are connected to respective programming zones 10-$i$ (where, in this example, i=1 to 5) that are provided in memory 6. Each programming zone 10-$i$ is adapted to store a set of parameters (constituting a set of running parameters) which are defined by means of the manual setting elements 3 and the manual programming elements 9-$i$ to which it is connected. Such a set, when stored in the zones 10-$i$, is referred to as a "set of programmed parameters". Its memorisation mode is explained later in this document.

In order to minimise the number of manual setting elements, the manual programming elements 9 have two operating modes. The first of these modes is one in which the manual programming element 9 which is actuated stores a set of running parameters as a set of programmed parameters in the programming zone 10 which is associated with the manual programming element concerned. In the second mode, a manual programming element designates a set of programmed parameters, thus enabling the installation interface 5 to establish adjustments corresponding to that set of programmed parameters.

Selection between these two operating modes is obtained using selection means 11 which, for this purpose, include a timer 12 and an electronic comparator 13.

Once a manual programming element 9-$i$ is actuated, this automatically sets in motion the measurement of an actuation period by the timer 12. This measurement continues so long as pressure is exerted on the same manual programming element 9-$i$. Once this pressure in interrupted, the timer 12 ceases its time measurement, and delivers to the comparator 13 the result R of its measurement. This result R is then compared to a predetermined time threshold value S which is memorised in the comparator 13.

If the threshold value S is smaller than the result R (i.e.S<R), then the threshold value is exceeded, and in consequence it is considered that the user wishes to memorise the set of running parameters in the appropriate programming zone 10-$i$. However, if the threshold value S is greater than the result R (i.e.S>R), then the threshold value is not reached, i.e. it is exceeded by a negative amount, and in consequence it is considered that the user wishes to define the set of programmed parameters which are stored in the appropriate programming zone 10-$i$ in order to make the corresponding adjustments.

Thus, a brief pressure (one that lasts for a shorter time than the time threshold value) on a manual programming element causes memorised adjustments to be made, while a long pressure (i.e. for a longer time than the time threshold value) causes the set of running parameters to be memorised.

It would of course be perfectly possible to envisage operation in the opposite way, with a long pressure on a manual programming element causing memorised adjustments to be carried out, while a short pressure would cause the set of running parameters to be memorised.

The deviation from the threshold value, (i.e. the positive or negative difference between the threshold value and the actual time over which pressure is exerted on the manual programming element) is selected during manufacture of the control apparatus, and therefore serves as a pre-defined selection criterion. The time threshold value can be very short, as for example, one second. Thus, a simple actuation by exerting an instantaneous pressure on a manual programming element automatically causes the corresponding adjustments to be carried out.

When a set of running parameters is memorised as a set of programmed parameters, the adjustments which are performed by the installation interface 5 are those which are memorised in the running adjustment zone 7, because they are the same. In consequence, the corresponding adjustments are carried out in the same way as in the standard (without programming) method of operation described above.

The electronic components necessary for the construction of the control system can be found without any difficulty among those commonly available in the trade. Such a system enables the user, for example, to program adjustments which are matched to his own metabolism, or to program a number of comfort levels, or even to program a rapid convergence (with a high airflow) or an slow convergence (with a weak airflow), or again, to program adjustments which are adapted to the burning of tobacco.

The operation of the apparatus, using the manual programming elements, is described below.

When the user wants to memorise a particular set of parameters, he defines those parameters using the manual setting elements 3. He then exerts prolonged pressure on the manual programming element 9-$i$ which he wants to make correspond with the defined set of parameters. The timer 12 measures the time of pressure on the programming element, and sends a signal accordingly to the comparator 13, which compares it with the threshold value. If the threshold value is smaller than the result of this measurement, the selection means authorises the memorisation of the set in the programming zone 10-$i$ which is connected to the manual programming element 9-$i$ that has been pressed.

If a set has already been memorised in the relevant programming zone 10-$i$, it is then definitively lost, and is replaced by the new set of programmed parameters. The set which is stored in the running adjustment zone 7 is compared with the correspondence table in the correspondence zone 8, which accordingly sends a corresponding signal to the installation interface 5. The interface 5 then carries out the adjustments which correspond to that signal.

By contrast, if the result of the time measurement is shorter than the threshold value, the selection means 11 commands a comparison to be carried out between the content of the programming zone 10-$i$ connected to the manual programming element 9-$i$ which has been operated, and the correspondence table contained in the correspondence zone 8, and then passes the corresponding information signals to the installation interface 5. The interface 5 then performs the appropriate adjustments in response to these signals.

If there is no set of parameters stored in the programming zone 10-$i$, the selection means commands the carrying out of adjustments corresponding to the set of running parameters that are stored in the running parameter zone 7 of the memory. In addition, if the user wants to re-establish adjustments which had been current before the programme mode was made use of, all he needs to do is to actuate any one of the manual setting elements 3 of data unit 1.

Figure 2:
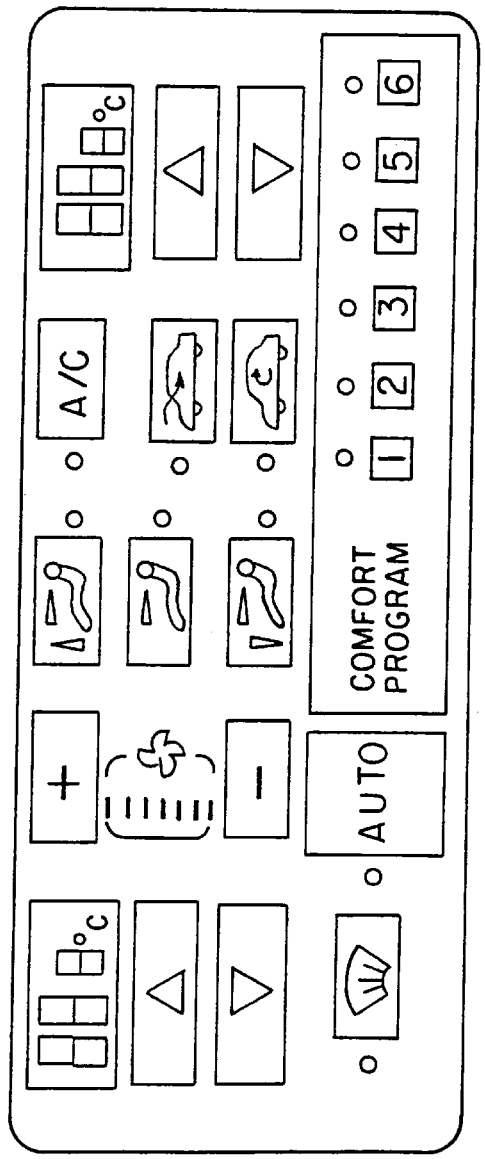
FIG. 2 shows a first example of a keypad and display unit in a system according to the invention.

Reference is now made to FIG. 2, which shows a first example of a setting and display keypad for a data unit that may be used in a control system such as is described above with reference to FIG. 1. The rectangular panel in the bottom right hand corner contains the touch pads and telltales for the programmed modes. Seven further touch pads, with telltales, enable the following parameters to be selected: windshield; cabin; whether or not recycled air is to be used; and air conditioning (A/C). Two pairs of cursor setting elements with "up" and "down" markings, and a digital display, enable values of temperature to be set in two zones of the cabin. A third pair of setting elements, of the cursor type with a graduated digital display, enables the air flow to be adjusted.

A setting element marked AUTO enables a standard comfort mode to be selected, with a temperature of 21° C., and the blower, the distribution means, the air inlet and the air conditioning then operate in an automatic mode which is defined by the internal and external conditions.

Operation of the specialised manual setting elements enables a departure to be made from the automatic mode or the programmed comfort mode. When the conditions desired by the user are achieved, action by the user on a manual programming element, in the manner described above, until the corresponding telltale lights up or some equivalent audible signal is given, memorises the running parameters in the program for that programming element.

When the vehicle is brought into use, all of the manual programming elements are for example set initially in the AUTO mode.

Convergence (the rapidity with which the system reaches the required state) is obtained by starting the blower. It may be rapid or slow, according to the programming mode.

Figure 3:
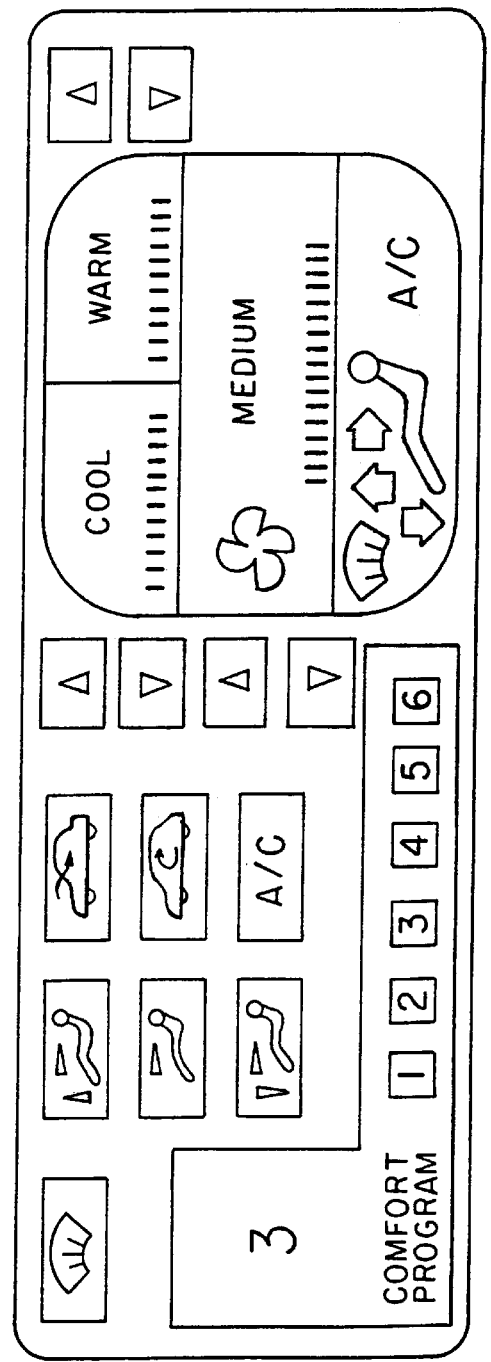
FIG. 3 shows another example of such a keypad and display unit.

With reference now to FIG. 3, this illustrates a second example of a setting and display keypad of a data unit which may be used with the system of the invention. The L-shaped panel in the lower left hand corner contains the indication of the running programmed mode (if necessary), above the six selection keypads for selecting pre-recorded programs. In the upper left hand part of the keypad, seven touch pads enable the following parameters to be selected: windshield; cabin; whether recycled air is to be used or not; and air conditioning (A/C). On the right hand side, a rectangular display, or main display, shows at the bottom the conditions which result from operation of the above mentioned seven touch pads, while in its upper part it shows the adjustments of the temperature in two zones of the cabin, together with the current speed setting of the blower. If necessary, the selection of corresponding parameters are accessible through three pairs of adjacent cursor-type touch pads flanking the main display. Because digital indication of temperature or blower speed is not always easy for the user to see, in this example it is replaced by a display which is given in terms of degrees, such as Cold, Cool, Comfort, Warm, Hot; the Mini (mum), Low, Medium, High, Maxi (mum). The AUTO touch pad may be omitted in this example.

The invention is not limited to the embodiments described above, but embraces all the variations which the person skilled in the art will be able to develop within the scope of the appended claims.

What is claimed is:

1. An electronic control system for a motor vehicle heating and ventilating installation comprising:

a control device comprising a memory for memorizing a table of correspondence between inputs comprising sets of parameters and operational adjustments, the control device adapted to control a passenger compartment environmental effector according to the parameters and adjustments;

a data unit including user-operable controls designed to obtain a set of running parameters from a user, the data unit further including manual programming elements, the memory comprising a plurality of zones, each adapted individually to store a set of parameters received from the user through the data unit in a pre-determined format, the control device further including means electrically connecting together each said memory zone with a corresponding said manual programming element;

wherein actuation of one of said manual programming elements causes the set of running parameters to be stored as a set of programmed parameters in the associated memory zone, the control device further adapted to designate a set of programmed parameters in accordance with a pre-defined criterion and to instigate said adjustments corresponding to said set of programmed parameters.

2. A system according to claim 1, wherein the control device is further arranged to cause said set of running parameters to be memorized in accordance with said pre-defined criterion as a set of programmed parameters in the memory zone associated with the manual programming element actuated.

3. A system according to claim 1, further including means defining said criterion in terms of the period of time for which a manual programming element is actuated.

4. A system according to claim 3, wherein the control device includes timing means for measuring the period during which the manual programming elements are being actuated, the control device being arranged to select, in accordance with said predefined criterion, an operating mode of the manual programming elements from a first mode and a second mode, the first mode being such that an actuated manual programming element causes a set of running parameters to be stored as a set of programmed parameters in the memory zone associated with that manual programming element, and the second mode being such that the manual programming element designates a set of programmed parameters.

5. A system according to claim 4, wherein the control device includes a comparator for performing a comparison between a first time value and a second time value, the first time value being the time for which a manual programming element is actuated, and the second time value being a pre-selected threshold value, said predefined criterion being defined in terms of which one of the first and second values exceeds the other.

6. A system according to claim 5, wherein, if said first time value exceeds said second time value, the control device is adapted to cause the manual programming element actuated to function in said first mode, and if said second value exceeds said first value, the control device is adapted to cause the manual programming element actuated to operate in said second mode.

7. A system according to claim 1, wherein the memory further includes a running adjustment zone for systematically memorizing, in a set of running parameters, the state of at least one of the parameters defined by the user by means of the data unit.

8. A system according to claim 7, wherein, in the case of operation of the system on said adjustments corresponding to a set of programmed parameters, the control device is adapted to re-establish adjustments corresponding to the set of running adjustments memorized in the running adjustment zone of the memory, when the data unit is actuated.

9. A system according to claim 1, further comprising a variable flow blower and means for distributing air treated by the installation, said parameters including at least one value of air flow rate delivered by the blower, and the temperature and a pattern of distribution of said treated air.

10. An apparatus comprising:
a memory configured to store a plurality of values of a running parameter for an operation level of a passenger compartment environmental effector of a vehicle;
an input interface configured to receive the plurality of values of the running parameter from a user and store the plurality of values in the memory, and to receive one of a plurality of possible trigger signals; and a controller that responds to the received trigger signal by retrieving a stored running parameter associated with the received trigger signal and driving the environmental effector in accord with the retrieved parameter.

11. The apparatus of claim 10, wherein the input interface has a plurality of input devices, the classifying being based on which of the devices is actuated by the user.

12. The apparatus of claim 10, the input interface being further configured to classify the trigger signal into one of a plurality of classes based on differential actuation of a common input device.

13. The apparatus of claim 12 wherein the classification is based on an amount of time the input device is actuated.

14. The apparatus of claim 13 wherein the classification is based on whether the actuation time exceeds a threshold time.

15. The apparatus of claim 10, further comprising a manual control of the environmental effector.

16. The apparatus of claim 15, the input interface being further configured to memorize the manual control setting when the trigger signal is received, and being further configured to receive a second trigger signal to resume the manual control setting.

17. The apparatus of claim 10, wherein:
the memory is configured to store a plurality of running parameters for operation levels of a corresponding plurality of passenger compartment environmental effectors of the vehicle;
the input interface is configured to receive values of the running parameters from the user and to store a grouped plurality of values for the operation levels of the effectors in the memory; and
the controller is configured to respond to the trigger signal by retrieving a stored group of running parameters and to drive the environmental effectors in accord with the corresponding retrieved parameters.

18. The apparatus of claim 17, wherein the input interface is further configured to classify the trigger signal into one of a plurality of classes, and the controller is configured to retrieve one of the grouped plurality of running parameters corresponding to the classification.

19. The apparatus of claim 18, wherein the input interface has a plurality of input devices, the classifying being based on which of the devices is actuated by the user.

20. The apparatus of claim 17, the input interface being further configured to classify the trigger signal into one of a plurality of classes based on differential actuation of a common input device.

21. The apparatus of claim 18, wherein the distinction is based on an amount of time the input device is actuated.

22. The apparatus of claim 18, wherein the distinction is based on whether the actuation time exceeds a threshold time.

23. The apparatus of claim 17, further comprising a manual control of at least one of the environmental effectors.

24. The apparatus of claim 23, the controller being further configured to store the control settings of those effectors having corresponding manual controls into the memory when a specified one of the trigger signals is received, and being further configured to respond to another of the trigger signals by resuming the manual control setting or settings.

25. The apparatus of claim 17, wherein the environmental effectors controlled by the memorized control parameters and controller include at least two of the group consisting of:
a variable flow blower;
a distribution pattern of air flow; and a temperature of air flow.

26. An apparatus comprising:
a memory configured to store running parameters for operation levels of a plurality of passenger compartment environmental effectors of a vehicle;
an input interface configured to receive values of the running parameters from a user and store a plurality of values for the operation levels of the effectors in the memory, and to receive a trigger signal; and
an controller that responds to the trigger signal by retrieving a stored group of running parameters and driving the environmental effectors in accord with the retrieved parameters.

27. The apparatus of claim 26, further comprising a manual control of at least one of the environmental effectors.

28. The apparatus of claim 27, the controller being further configured to store the control settings of those effectors having corresponding manual controls into the memory when a specified one of the trigger signals is received, and being further configured to respond to another of the trigger signals by resuming the manual control setting or settings.

29. The apparatus of claim 26, wherein the environmental effectors controlled by the memorized control parameters and controller include at least two of the group consisting of:
controlling a variable flow blower;
controlling a distribution pattern of air flow; and
controlling a temperature of air flow.

* * * * *